(12) United States Patent
Dellinger et al.

(10) Patent No.: US 9,983,377 B2
(45) Date of Patent: May 29, 2018

(54) ENCLOSURE WITH COMBINED STRAIN RELIEF AND GROUNDING

(71) Applicant: CORNING OPTICAL COMMUNICATIONS LLC, Hickory, NC (US)

(72) Inventors: Thomas Alban Dellinger, North Richland Hills, TX (US); Karyne Poissant Prevratil, Fort Worth, TX (US); John Joseph Stillwell, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 200 days.

(21) Appl. No.: 14/747,369

(22) Filed: Jun. 23, 2015

(65) Prior Publication Data
US 2015/0378121 A1  Dec. 31, 2015

Related U.S. Application Data

(60) Provisional application No. 62/018,725, filed on Jun. 30, 2014.

(51) Int. Cl.
*G02B 6/44* (2006.01)

(52) U.S. Cl.
CPC ......... *G02B 6/4471* (2013.01); *G02B 6/4442* (2013.01); *G02B 6/4454* (2013.01)

(58) Field of Classification Search
CPC .. G02B 6/4471; G02B 6/3897; G02B 6/4452; G02B 6/4454; G02B 6/4477; G02B 6/4441; G02B 6/3879; G02B 6/4442; G02B 6/4478; G02B 6/4446
See application file for complete search history.

(56) References Cited

U.S. PATENT DOCUMENTS

| 7,603,020 | B1 * | 10/2009 | Wakileh | G02B 6/4477 |
| | | | | 385/134 |
| 7,702,208 | B2 * | 4/2010 | Mudd | G02B 6/4442 |
| | | | | 385/135 |
| 7,783,152 | B2 | 8/2010 | Knorr et al. | 385/136 |
| 2008/0060421 | A1 * | 3/2008 | Muller | G01M 3/229 |
| | | | | 73/49.2 |

(Continued)

FOREIGN PATENT DOCUMENTS

| EP | 1970737 A1 | 9/2008 | G02B 6/44 |
| EP | 2195694 B1 | 3/2012 | G02B 6/44 |
| WO | WO2007118548 A1 | 10/2007 | H02G 15/013 |

(Continued)

OTHER PUBLICATIONS

Corning Cable Systems GmbH & Co. KG, Evolant Closures Datasheet Collection, 2007-2008, 33 pages.

(Continued)

*Primary Examiner* — Thomas A. Hollweg
*Assistant Examiner* — Mary A El Shammaa
(74) *Attorney, Agent, or Firm* — Robert L. Branham

(57) ABSTRACT

An enclosure for telecommunication cables includes a body that defines an interior of the enclosure, a grounding base secured relative to the body, and at least one strain relief assembly having a strain relief member and grounding member that are jointly coupled to the grounding base. Related methods of installing enclosures are also disclosed.

13 Claims, 4 Drawing Sheets

(56) References Cited

U.S. PATENT DOCUMENTS

2012/0256526 A1* 10/2012 Wei .................. G02B 6/4442
　　　　　　　　　　　　　　　　　　　　312/237
2013/0336622 A1* 12/2013 Islam ................ G02B 6/4471
　　　　　　　　　　　　　　　　　　　　385/100

FOREIGN PATENT DOCUMENTS

WO　　WO2009103443 A1　　8/2009　............... G02B 6/44
WO　　WO2009146022 A2　　12/2009　............... G02B 6/46

OTHER PUBLICATIONS

Corning Cable Systems GmbH & Co. KG, Frecap Max 48, 72, 120 SRP, Issue 3, Dec. 2011, 30 pages.
Corning Cable Systems LLC, SCG-8C18 Gel Splice Closure SRP, Issue 2, Oct. 2012, 12 pages.

* cited by examiner

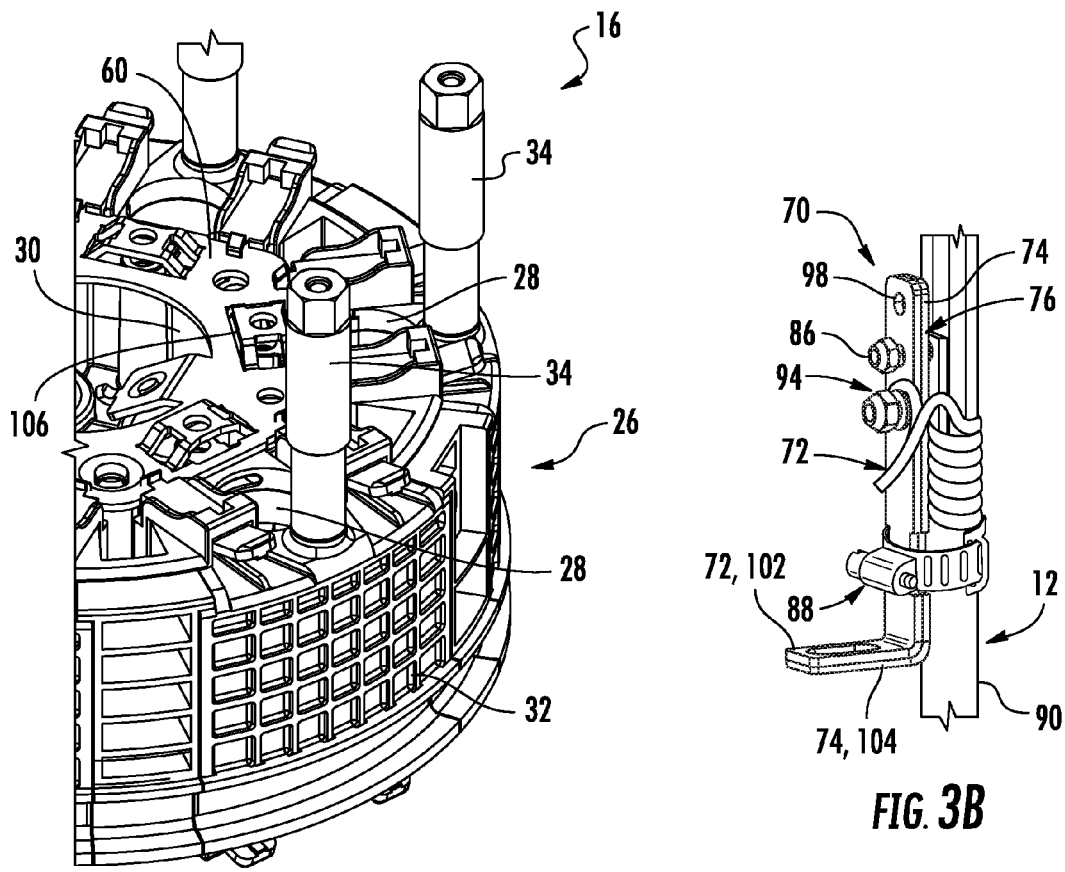
FIG. 3A
FIG. 3B
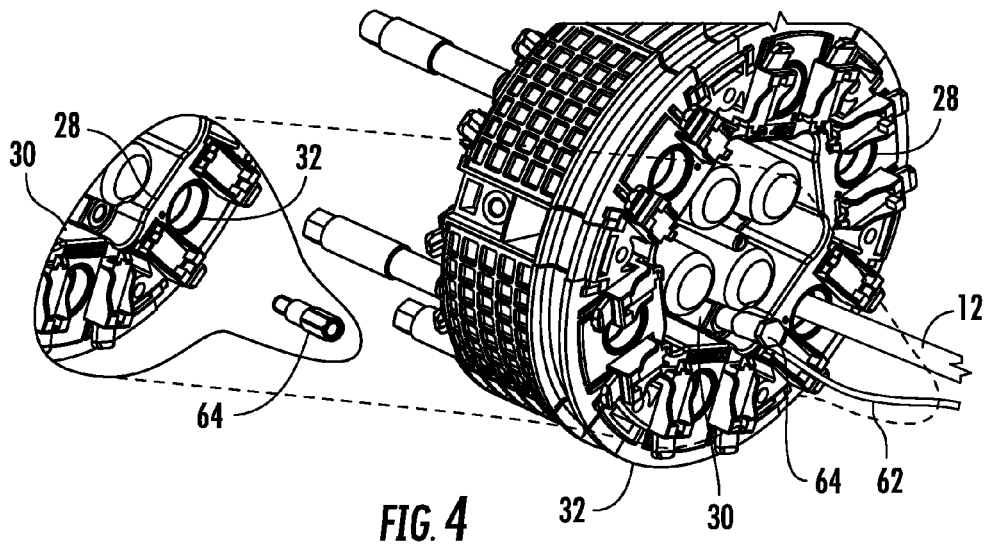
FIG. 4

ENCLOSURE WITH COMBINED STRAIN RELIEF AND GROUNDING

PRIORITY APPLICATION

This application claims the benefit of priority under 35 U.S.C. § 119 of U.S. Provisional Application Ser. No. 62/018,725, filed on Jun. 30, 2014, the content of which is relied upon and incorporated herein by reference in its entirety.

BACKGROUND

This disclosure relates generally to telecommunication cables, and more particularly to enclosures for telecommunication cables and methods of installing such enclosures.

In a telecommunications network, there are typically several locations where one or more cables are spliced to other cables. For example, in a fiber optic network, optical fibers from a feeder cable may be spliced to respective optical fibers of one or more distribution cables at one location (such as a "local convergence point" or LCP). The distribution cables may then extend to another location (such as a "fiber distribution terminal") where the optical fibers of the distribution cable are spliced to optical fibers of one or more subscriber drop cables. The splices at these various locations within a fiber optic network are typically housed within an enclosure (sometimes referred to as "splice closure" or simply "closure"), which may also be configured to house splitters, couplers, and other optical hardware. The closures protect the splices and hardware from environmental degradation, strain, and/or other undesirable forces, thereby increasing the reliability and quality of the splices.

A variety of designs are known for closures, including dome-type closures and in-line closures. Regardless of the particular design, telecommunication cables extending into an interior of a closure are typically restrained to protect the communication links (e.g., optical fibers or copper wires) carried within the cables from potentially damaging loads such as tensile, torsional, and/or bending loads. This "strain relief" may occur within the interior of the closure or on an exterior of the closure.

In addition to being provided with strain relief, many cables are electrically grounded to minimize the risk of damage or injury from unwanted electrical current. For example, some fiber optic cables include armor within the cables to provide additional mechanical strength/protection. The material of the armor is typically metal or another electrical conductor. Thus, although the optical fibers in such fiber optic cables may not carry electrical power, the conductive property of the armor creates the potential for electrical shocks and other hazards.

The strain relieving and grounding are performed when installing a closure in a telecommunications network. Although these steps have been performed in a variety of ways since the first use of closures, there remains room for improvement. Facilitating the steps (and, therefore, the installation of closures) remains desirable.

SUMMARY

One embodiment of the disclosure relates to an enclosure for telecommunication cables. The enclosure includes a body that defines an interior of the enclosure, a grounding base secured relative to the body, and at least one strain relief assembly or system having a strain relief member and grounding member that are jointly coupled to the grounding base.

An additional embodiment of the disclosure is an enclosure for telecommunication cables that includes means for jointly or simultaneously strain relieving and grounding at least one of the telecommunication cables independently from the other telecommunication cables. Such an enclosure may also include a body that defines an interior of the enclosure and a grounding base secured relative to the body, and in such embodiments the strain relieving and grounding may be with respect to the grounding base.

Another embodiment of the disclosure relates to an enclosure for telecommunication cables that include a conductive material. The enclosure includes a body defining an interior of the enclosure, a grounding base secured relative to the body, and at least one strain relief assembly or system including a strain relief member and grounding member that are jointly coupled to the grounding base. The grounding base is configured to be electrically coupled to the conductive material (e.g., armor) of at least one of the telecommunication cables without the use of grounding wires.

Yet another embodiment of the disclosure relates to an enclosure for a plurality of telecommunication cables that each include a conductive material. The enclosure includes a body defining an interior of the enclosure, a grounding base secured relative to the body, and a plurality of strain relief systems coupled to the grounding base. Each strain relief system is configured to independently provide strain relief and electrical grounding for one of the telecommunication cables, such that the grounding base is configured to be electrically coupled to the conductive material of the telecommunication cables via the strain relief systems. The strain relief system may comprise a bracket configured to simultaneously provide the strain relief and electrical grounding such that no other brackets are required. This may be the case if the bracket is formed from a highly conductive material (e.g., brass or copper) and with geometry/dimensions that provide sufficient structural integrity. Alternatively, each strain relief system comprises a separate strain relief member and grounding member that are jointly coupled to the grounding base.

Any of the embodiments in the disclosure relating to an enclosure for telecommunication cables may be provided in an unassembled or partially assembled state. For example, one embodiment of an enclosure includes a body defining an interior of the enclosure, a grounding base secured or configured to be secured relative to the body, and a strain relief kit. The strain relief kit includes a strain relief member and grounding member configured to be jointly coupled to the grounding base.

Methods of installing an enclosure on telecommunication cables are also disclosed. One embodiment of such a method involves: extending at least one of the telecommunication cables through an opening of the enclosure; securing the at least one telecommunication cable to a strain relief member; electrically coupling armor material in the at least one telecommunication cable to a grounding member; and jointly coupling the strain relief member and grounding member to a grounding base of the enclosure. Thus, the strain relief member and grounding member are coupled to the grounding base at one or more common locations on the grounding base.

Additional features and advantages will be set forth in the detailed description which follows, and in part will be readily apparent to those skilled in the technical field of telecommunications hardware and equipment. It is to be understood that both the foregoing general description, the following detailed description, and the accompanying drawings are merely exemplary, and are intended to provide an overview or framework to understand the nature and character of the claims. It is also to be understood that features and attributes associated with embodiments shown in one of the drawings may be applied to embodiments shown in others of the drawings.

BRIEF DESCRIPTION OF THE DRAWINGS

FIG. 3A is an enlarged perspective view of a portion of an end cap assembly of the enclosure of FIG. 1, without having telecommunication cables installed;

FIG. 3B is an enlarged perspective view of one embodiment a strain relief assembly for securing and grounding a telecommunication cable on the end cap assembly of FIG. 3A;

FIG. 4 is a perspective view of a portion of an exterior of the end cap assembly of FIG. 3A;

DETAILED DESCRIPTION

Figure 1:
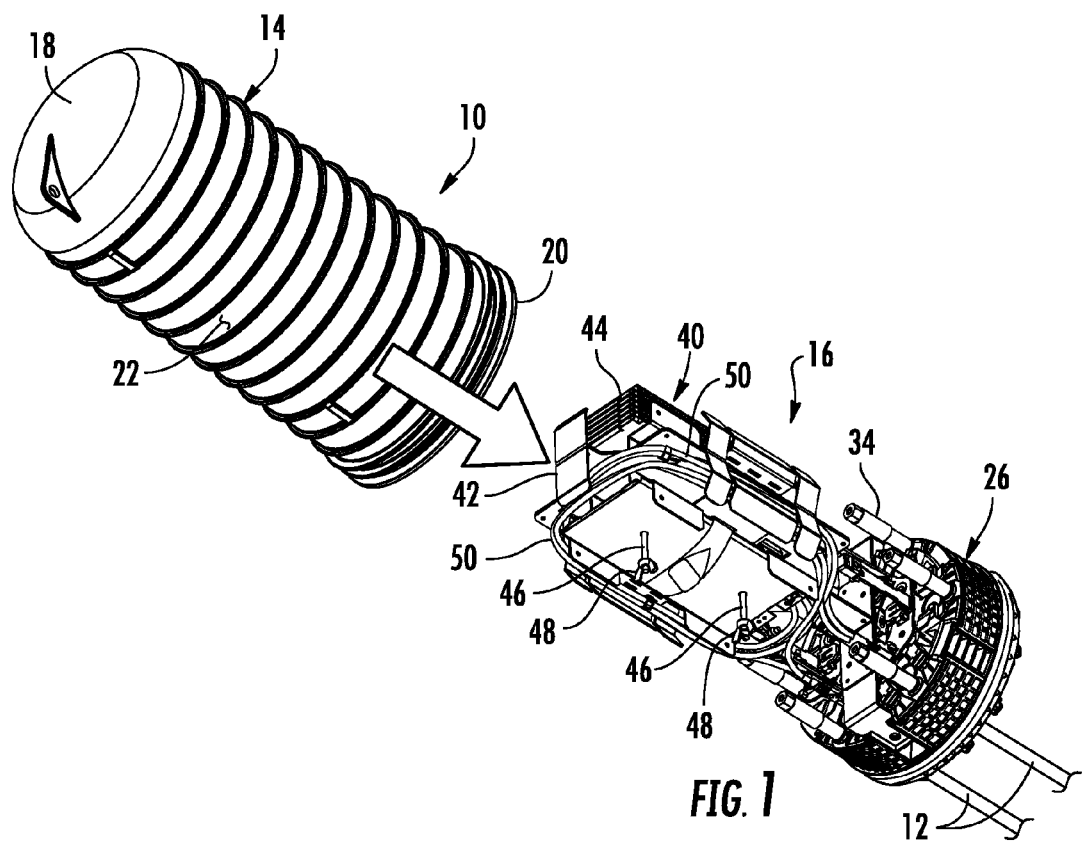
FIG. 1 is a perspective view of one embodiment of an enclosure for telecommunication cables in an open configuration.
Figure 2:
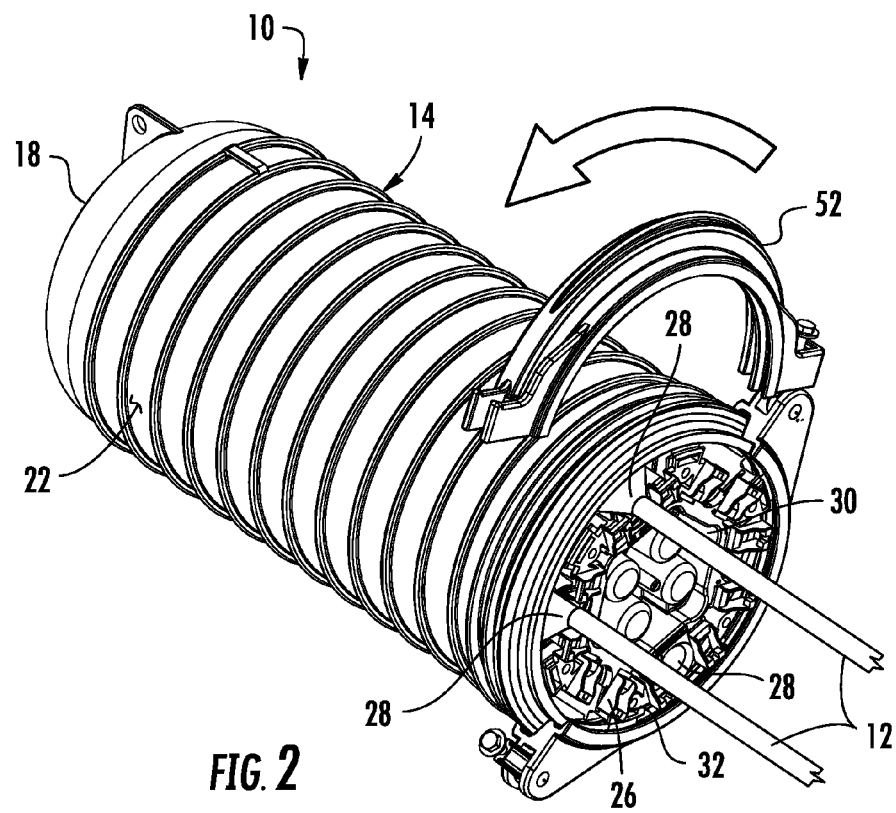
FIG. 2 is a perspective of the enclosure of FIG. 1 in a closed configuration.

Various embodiments will be further clarified by the following examples. To this end, FIGS. 1 and 2 illustrate one example of an enclosure 10 (or simply "closure") for telecommunication cables. Although the enclosure 10 is shown as dome-type closure for fiber optic cables 12, the description below relates to details that may apply to other types of enclosures. This includes enclosures having an in-line or other type of arrangement instead of a dome-type arrangement, as well as enclosures designed for use with copper cables instead of or in addition to fiber optic cables. A general overview of the enclosure 10 will be provided simply to facilitate discussion.

As shown in FIGS. 1 and 2, the enclosure 10 includes a canister or cover 14 configured to be received over an end cap assembly 16. The canister 14 is substantially dome-shaped with a first end 18 that is closed and an opposite, second end 20 that is open. A wall 22 of the canister 14 extends around a longitudinal axis between the first and second ends 18, 20 to define an internal cavity. Such an arrangement allows the canister 14 to be placed over the end cap assembly 16, as shown by the arrow in FIG. 1.

The end cap assembly 16 includes an end cap 26 having entry openings 28 to allow the fiber optic cables 12 to extend through the end cap 26. Although six entry openings are provided around a periphery of the end cap 26 in the embodiment shown, there may be a different number of entry openings in other embodiments. Additionally, in the embodiment shown, the end cap 26 includes a central member 30 and a plurality of sealing members 32 secured around a periphery of the central member 30. The number of sealing members 32 corresponds to the number of entry openings 28 around the periphery of the end cap 26. Such an arrangement allows the fiber optic cables 12 to be sealed in each entry opening 28 individually by adjusting (e.g., screwing) pressure members 34 associated with respective sealing members 32. However, other arrangements not involving individual sealing or separate sealing members are also possible.

The end cap assembly 16 also includes a fiber management assembly 40 having a frame 42 removably mounted to the end cap 26 and splice trays 44 carried by the frame 42. The splice trays 44 may be mounted to the frame 42 using bolts 46 and wing nuts 48, for example. Buffer tubes 50 extending from end portions of the fiber optic cables 12 may be routed to storage areas defined by the frame 42 and/or to the splice trays 44. The buffer tubes 50 contain optical fibers (not shown) that may be spliced to other optical fibers, with the splices being stored on the splice trays 44.

When the canister 14 is placed over the end cap assembly 16, the components of the fiber management assembly 40 are accommodated in the internal cavity of the canister 14. A clamping ring 52 or the like may be used to secure the canister 14 to the end cap 26, thereby closing the second end 20 of the canister 14. Thus, together the canister 14 and end cap 26 define a body of the enclosure 10. The body has an interior defined by the internal cavity of the canister 14.

Now that a general overview of the enclosure 10 has been provided, reference can be made to FIGS. 3A and 3B, which illustrate a portion of the end cap assembly 16 and an end portion of one of the fiber optic cables 12 in further detail. As can be seen, the enclosure 10 includes a grounding base 60 secured to the end cap 26. The grounding base 60 in this embodiment is a ring-shaped plate bolted to the central member 30 of the end cap 26 at various locations (the bolts are not shown). An electrically-conductive path is established from one or more of these locations to one or more locations on an exterior of the end cap 26 where, as shown in FIG. 4, a ground cable 62 may be attached via a grounding screw 64. Some or all of the central member 30 may be formed from an electrically-conducting material to establish the electrically-conductive path.

Referring back to FIGS. 3A and 3B, the fiber optic cable 12 is configured to be secured to the end cap 26 via the grounding base 60. More specifically, the enclosure 10 includes a strain relief assembly 70 (or "strain relief system 70") for both securing and grounding the fiber optic cable 12 to the grounding base 60. Providing a single assembly for both strain relieving and grounding the fiber optic cable 12 with respect to the grounding base 60 facilitates installation of the enclosure 10 in that both actions can occur simultaneously. This ability is due to the strain relief assembly 70 including a strain relief member 72 and grounding member 74 configured to be jointly coupled to the grounding base 60. The joint coupling for the embodiment shown in FIGS. 3A and 3B will be more apparent after first describing some additional details of the strain relief member 72 and grounding member 74.

In the embodiment shown, the strain relief member 72 is in the form of a strain relief bracket and the grounding member 74 is in the form of a grounding bracket. Both the strain relief member 72 and grounding member 74 are substantially L-shaped. Having substantially similar shapes enables the strain relief member 72 and grounding member 74 to be stacked or otherwise overlaid before securing the fiber optic cable 12 to the strain relief assembly 70 and before being jointly coupled to the grounding base 60. For example, the strain relief member 72 may have one or more planar surfaces abutting and facing one or more planer surfaces of the grounding member 76. In other embodiments, the strain relief member 72 and grounding member 74 may have different shapes or designs, but each still include a portion configured to be jointly coupled to the grounding base 60 with the other.

One advantage of having both a strain relief member 72 and grounding member 74 as part of the strain relief assembly 70 is that the material of each may be chosen with different purposes in mind. For example, the strain relief member 72 may be formed from a first material with a relatively high strength (e.g., modulus of elasticity), such as stainless steel, to provide the strain relief assembly 70 with most or all of the structural stability required for strain relieving the fiber optic cable 12. The grounding member 74, on the other hand, may be formed from a second material with a relatively high electrical conductivity, such as copper or brass, to sufficiently ground the fiber optic cable 12. The phrase "relatively high" in this context refers to properties of the first or second material in relation to each other. As can be appreciated, strength of the first material need not be compromised to achieve better electrical conductivity, while electrical conductivity of the second material need not be compromised to achieve better strength.

Figure 5:
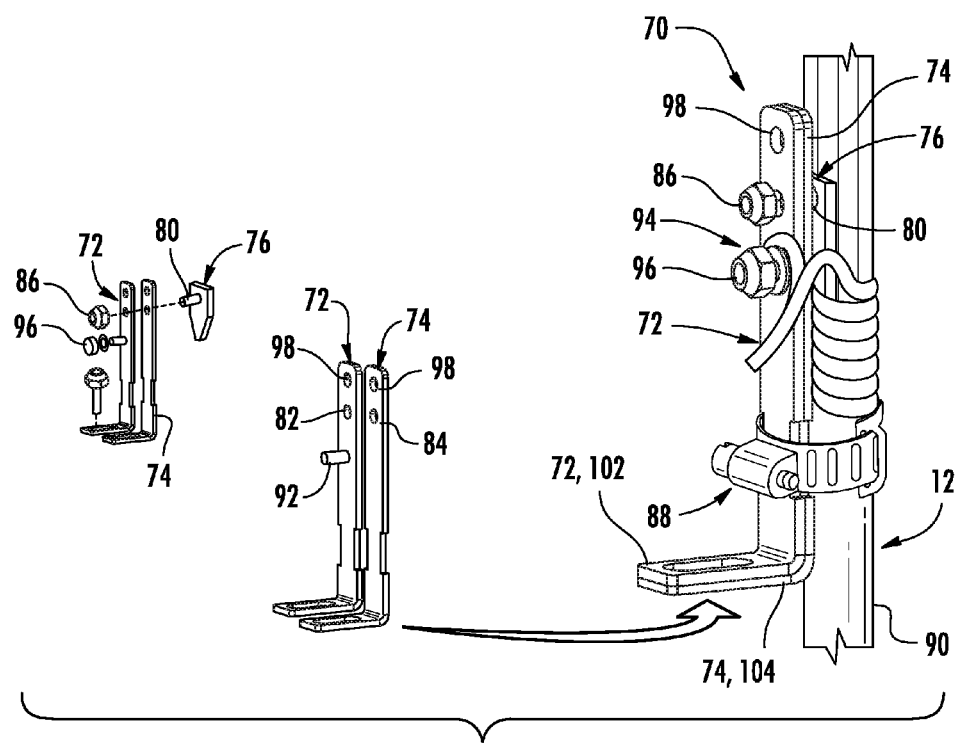
FIG. 5 is a schematic view illustrating the installation of the strain relief assembly of FIG. 3B.

As shown in FIG. 5, the strain relief assembly 70 may be installed by positioning a portion of a clamp member 76 of the strain relief assembly 70 under armor (hidden from view in FIG. 5) of the fiber optic cable 12. The clamp member 76 may include both a top plate and bottom plate (not shown to simplify matters) with a portion of the latter being what is partially positioned under/behind the armor of the fiber optic cable 12. The top plate is positioned on/in front of the armor such that the armor is between the bottom plate and top plate. Vinyl tape 78 or the like may be wrapped around an end portion of the fiber optic cable 12 and over the top plate to help secure the clamp member 76. The clamp member 76 may also include a threaded stud 80, which may be integral (e.g., welded) with the bottom plate or top plate or which may be a bolt or the like extending through the top plate and/or bottom plate.

In the particular embodiment shown, the strain relief member 72 and grounding member 74 include respective holes 82, 84 that allow the strain relief member 72 and grounding member 74 to be installed onto the threaded stud 80 of the clamp member 76. The grounding member 74 is installed first so as to be positioned between the strain relief member 72 and top plate of the clamp member 76. A nut 86 may then be fastened onto the threaded stud 80 to further secure the clamp member 76 to the fiber optic cable 12 and to secure the strain relief member 72, grounding member 74, and clamp member 76 together. A portion of the top plate of the clamp member 76 is held in contact with a portion of the grounding member 74 at this point.

To further secure the strain relief assembly 70 to the fiber optic cable 12, a hose clamp 88 or the like may be wrapped around both the end portion of the fiber optic cable 12 and a portion of the strain relief assembly 70 including the strain relief member 72. The hose clamp 88 wraps around both the strain relief member 72 and grounding member 74 in the embodiment shown, as the grounding member 74 is positioned between the strain relief member 72 and an outer jacket 90 of the fiber optic cable 12. Like the clamp member 76, the strain relief member 72 may also include a threaded stud 92 that may be integral (e.g., welded) with the strain relief bracket or that may be a bolt or the like extending through the strain relief bracket (and possibly through the grounding bracket). Aramid yarn 94 or other strength material from the fiber optic cable 12 is wrapped around the threaded stud 92 of the strain relief member 72 and secured using a nut 96. Although not shown in FIG. 5, the fiber optic cable 12 may also include a strength member secured to the strain relief assembly 70 using additional hardware (e.g., a restraining member, threaded stud, and nut) that interfaces with holes 98 in the strain relief member 72 and grounding member 74.

Referring back to FIGS. 3A and 3B, and as mentioned above, the strain relief assembly 70 both secures and grounds the fiber optic cable 12 to the grounding base 60. In the embodiment shown, the strain relief member 72 and grounding member 74 are jointly coupled to the grounding base 60 by inserting foot portions 102, 104 of the strain relief member 72 and grounding member 74 into a mounting slot 106 provided on the grounding base 60. The mounting slot 106 may be configured to securely engage the foot portions 102, 104, such as with a snap-fit or the like, so that no threaded fasteners are needed to provide the joint coupling. If desired, however, one or more threaded fasteners may be used to additionally or alternatively provide the joint coupling. For example, in some embodiments a bolt (not shown) may be used to secure the foot portions 102, 104 to the grounding base 60.

As can be appreciated, when the strain relief member 72 and grounding member 74 are jointly coupled to the grounding base 60, the fiber optic cable 12 is both grounded and secured with respect to the grounding base 60. The grounding in the embodiment described occurs by way of an electrically-conductive path from the armor of the fiber optic cable 12, through the clamp member 76 and grounding member 74, and to the grounding base 60 (where the path may continue to the ground cable 62 secured to an exterior of the end cap 26; see discussion of FIG. 4 above). Although the grounding member 74 may provide some support, the strain relief for the fiber optic cable 12 comes primarily from the strength of the strain relief member 72. As already mentioned, providing a single assembly for both strain relieving and grounding the fiber optic cable 12 with respect to the grounding base 60 facilitates installation of the enclosure 10 in that both actions can occur simultaneously. Additional steps to secure grounding wires or the like between the grounding base 60 and an element (e.g., a clamp member) electrically coupled to armor or other conductive material of a telecommunication cable are not required.

Figure 6:
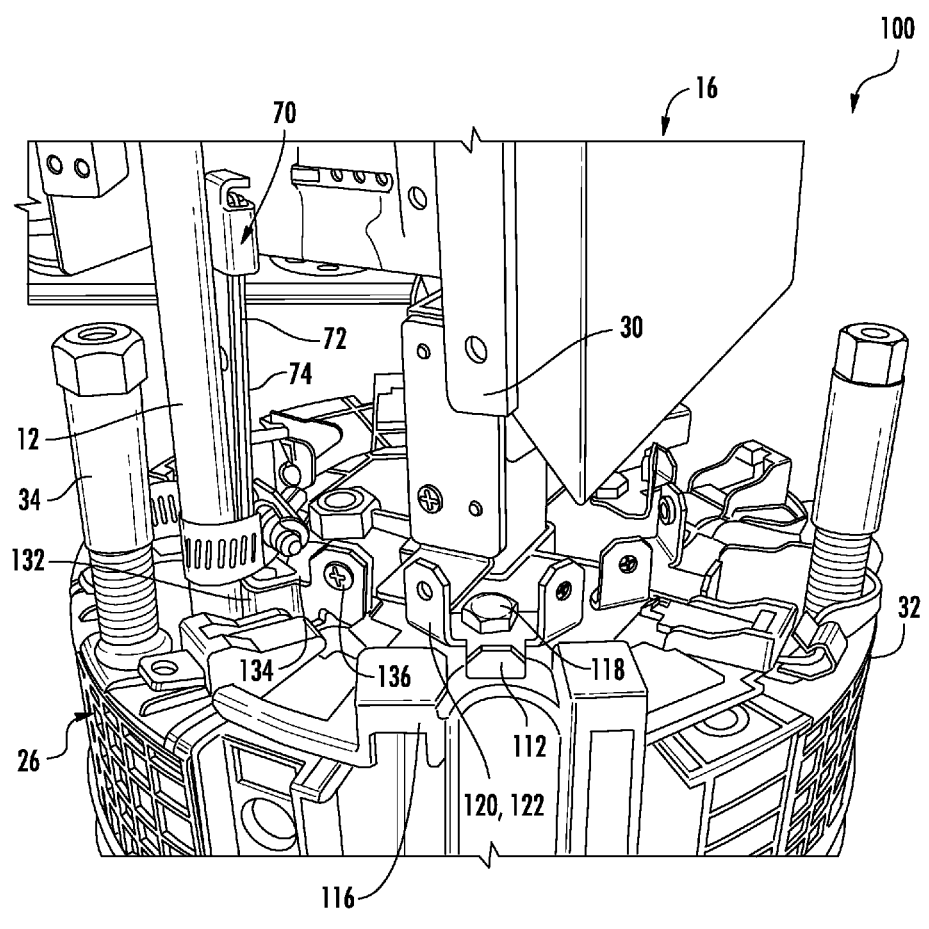
FIG. 6 is an image of a portion of an enclosure according to another embodiment.

Other ways of achieving the joint coupling of the strain relief assembly 70 will be appreciated by persons skilled in the field of telecommunications hardware and equipment. FIG. 6, for example, illustrates a portion of an enclosure 110 according to another embodiment. The same reference numbers are used in FIG. 6 to refer to elements corresponding to those in the enclosure 10. Accordingly, only the differences in the enclosure 110 will be described.

As shown in FIG. 6, one or more support brackets 112 may be secured to the end cap 26 at locations proximate the entry openings 28. The support brackets 112 are constructed from a material with relatively high electrical conductivity. For example, the support brackets 112 may be constructed from a material with electrically conductive properties the same as or similar to those of the material of the grounding member 74. FIG. 6 illustrates the support brackets 112 being bolted directly to the central member 30 of the end cap 26. Although not shown, a ring-shaped plate similar to the grounding base 60 (FIG. 3A) may be provided between the support brackets 112 and central member 30 to serve as the grounding base and electrically couple (i.e., establish an electrically-conductive path between) the support brackets 112. Alternatively, such a ring-shaped plate may be provided on an exterior of the end cap 26 to electrically couple conductive paths associated with the support brackets 112 so that a ground cable only needs to be secured to a single location on the end cap 26 (similar to FIG. 4). Another alternative is having portions or all of the central member 30 constructed from a material with electrically conductive properties the same as or similar to those of the grounding member 74. The support brackets 112 and/or the central member 30 may be considered as the grounding base in such embodiments.

In the embodiment shown in FIG. 6, threaded fasteners 116 (e.g., bolts) are used to secure a bottom portion 118 of each support bracket 112 to the central member 30. The bottom portion 118 extends in a horizontal plane. The support brackets 112 also include a top portion 120 defined by one or more tabs or walls 122 extending substantially perpendicular to the bottom portion 118 (and, therefore, substantially perpendicular to a ring-shaped plate if one is provided for the grounding base, and/or substantially perpendicular to a top surface of the central member 30). Two tabs 122 are provided on each of the support brackets 112 on opposite sides of the corresponding threaded fastener 116 in the embodiment shown in FIG. 6.

The strain relief member 72 and grounding member 74 of the strain relief assembly 70 in this embodiment each have a foot portion 132, 134 with a shape similar to that of the support brackets 112. The foot portions 132, 134 may be positioned on the same or different sides of the support brackets 112 and secured to the tabs 122 using bolts 136 or other fasteners. Due to the shape of the tabs 122 and support brackets 112, the bolts 136 are positioned on opposite sides of the fiber optic cable 12 being secured and grounded by the strain relief assembly 70. Such an arrangement facilitates access to the bolts 136 and, therefore, facilitates the process of jointly coupling the strain relief member 72 and grounding member 74 to the support brackets 112 (and, therefore, to the grounding base).

It will be apparent to those skilled in the art that various modifications, variations, combinations, and sub-combinations of the embodiments described above can be made without departing from the spirit or scope of the claims below. For example, although the strain relief member 72 and grounding member 74 are shown and described as separate components, in alternative embodiments a common component may define the strain relief member and grounding member (i.e., the strain relief member and grounding member may be integrally formed as a unitary or monolithic structure). The common component could be in the form of a single bracket configured to simultaneously provide the strain relief and electrical grounding. This may be the case if the bracket is formed from a highly conductive material (e.g., brass or copper) and with geometry/dimensions that provide sufficient structural integrity for strain relief.

It will also be apparent to those skilled in the art that unless otherwise expressly stated, it is in no way intended that any method in this disclosure be construed as requiring that its steps be performed in a specific order. For example, although the fiber optic cable 12 is described above as being secured to the strain relief assembly 70 before securing the latter to the grounding base, in alternative embodiments the strain relief assembly 70 may be secured to the grounding base before securing the fiber optic cable 12. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. An enclosure for telecommunication cables, comprising:

a body defining an interior of the enclosure;

an end cap comprising at least one entry opening to allow at least one fiber optic cable to extend through the end cap into the interior of the enclosure;

a grounding base secured to the end cap, wherein the grounding base comprises a ring-shaped plate having at least one mounting slot; and at least one L-shaped strain relief member for providing stain relief to the at least one fiber optic cable, wherein the at least one L-shaped strain relief member comprises a first foot portion;

at least one L-shaped grounding member for proving electrical grounding to the at least one fiber optic cable, wherein the at least one L-shaped grounding member comprises a second foot portion, wherein the at least one L-shaped strain relief member and the at least one L-shaped grounding member are stackable to allow positioning of the first foot portion and the second foot portion in the at least one mounting slot of the ring-shaped plate;

at least one clamp member for positioning between an optical fiber and an armor of the at least one fiber optic cable, wherein the at least one clamp member is securable to the at least one L-shaped grounding member to facilitate a first electrically conductive path from the armor of the at least one fiber optic cable to the at least one L-shaped grounding member; and an second electrically-conductive path established from the base to one or more locations outside of the interior of the enclosure.

2. An enclosure according to claim 1, wherein the at least one strain relief member has a higher modulus of elasticity than the at least one grounding member.

3. An enclosure according to claim 1, wherein the at least one grounding member has a higher electrical conductivity than the at least one strain relief member.

4. An enclosure according to claim 1, wherein the at least one strain relief member has one or more planar surfaces abutting one or more planer surfaces of the at least one grounding member.

5. An enclosure according to claim 1, wherein the at least one strain relief member comprises a first material and the at least one grounding member comprises a second material, wherein the first material is different from the second material.

6. An enclosure according to claim 1, wherein the first foot of the at least one strain relief member and the second foot of the at least one grounding member are positionable in the at least one mounting slot of the ring-shaped plate without the use of a threaded fastener.

7. An enclosure according to claim 1, wherein the body includes a canister that defines the interior.

8. An enclosure for telecommunication, the enclosure comprising:

a body defining an interior of the enclosure;

an end cap comprising at least one entry opening to allow at least one fiber optic cable to extend through the end cap into the interior of the enclosure;

a grounding base secured to the end cap, wherein the grounding base comprises a ring-shaped plate having at least one mounting slot; and at least one L-shaped strain relief member for providing strain relief to the at least one fiber optic cable, wherein the at least one L-shaped strain relief member comprises a first foot portion;

at least one L-shaped grounding member for proving electrical grounding to the at least one fiber optic cable, wherein the at least one L-shaped grounding member comprises a second foot portion, wherein the at least one L-shaped strain relief member and the at least one L-shaped grounding member are stackable to allow positioning of the first foot portion and the second foot portion in the at least one mounting slot of the ring-shaped plate;

at least one clamp member for positioning between an optical fiber and an armor of the at least one fiber optic cable, wherein the at least one clamp member is securable to the at least one L-shaped grounding member to facilitate a first electrically conductive path from the armor of the at least one fiber optic cable to the at least one L-shaped grounding member, wherein the first electrically conductive path does not include grounding wires; and an second electrically-conductive path established from the base to one or more locations outside of the interior of the enclosure.

9. An enclosure according to claim 8, wherein the at least one strain relief member has a higher modulus of elasticity than the at least one grounding member.

10. An enclosure according to claim 8, wherein the at least one grounding member has a higher electrical conductivity than the at least one strain relief member.

11. An enclosure according to claim 8, wherein the at least one strain relief member has one or more planar surfaces abutting one or more planer surfaces of the at least one grounding member.

12. An enclosure according to claim 8, wherein the at least one strain relief member comprises a first material and the at least one grounding member comprises a second material, wherein the first material is different from the second material.

13. An enclosure according to claim 8, wherein the first foot of the at least one strain relief member and the second foot of the at least one grounding member are positionable in the at least one mounting slot of the ring-shaped plate without the use of a threaded fastener.

* * * * *

UNITED STATES PATENT AND TRADEMARK OFFICE
CERTIFICATE OF CORRECTION

PATENT NO.       : 9,983,377 B2
APPLICATION NO.  : 14/747369
DATED            : May 29, 2018
INVENTOR(S)      : Thomas Alban Dellinger et al.

Page 1 of 1

It is certified that error appears in the above-identified patent and that said Letters Patent is hereby corrected as shown below:

In the Claims

In Column 8, Line 9, Claim 1, delete "stain" and insert -- strain --, therefor.

Signed and Sealed this
Seventeenth Day of December, 2019

Andrei Iancu
*Director of the United States Patent and Trademark Office*